July 8, 1969  J. W. TURNER, JR  3,454,297
CONVERTIBLE ELEVATOR
Filed Oct. 12, 1966  Sheet 1 of 6

INVENTOR.
JOHN W. TURNER, JR.
BY *[signature]*
ATTORNEY

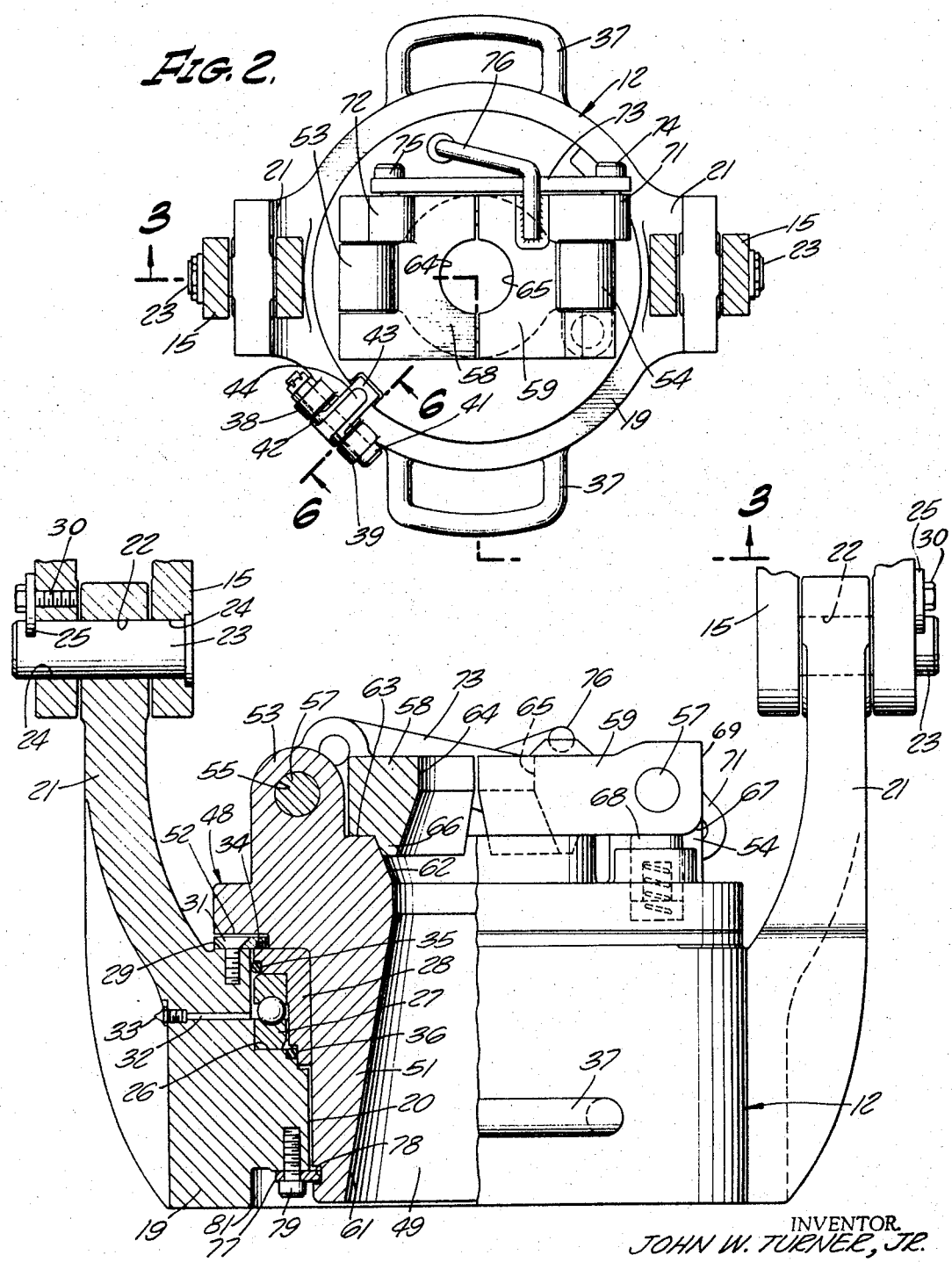

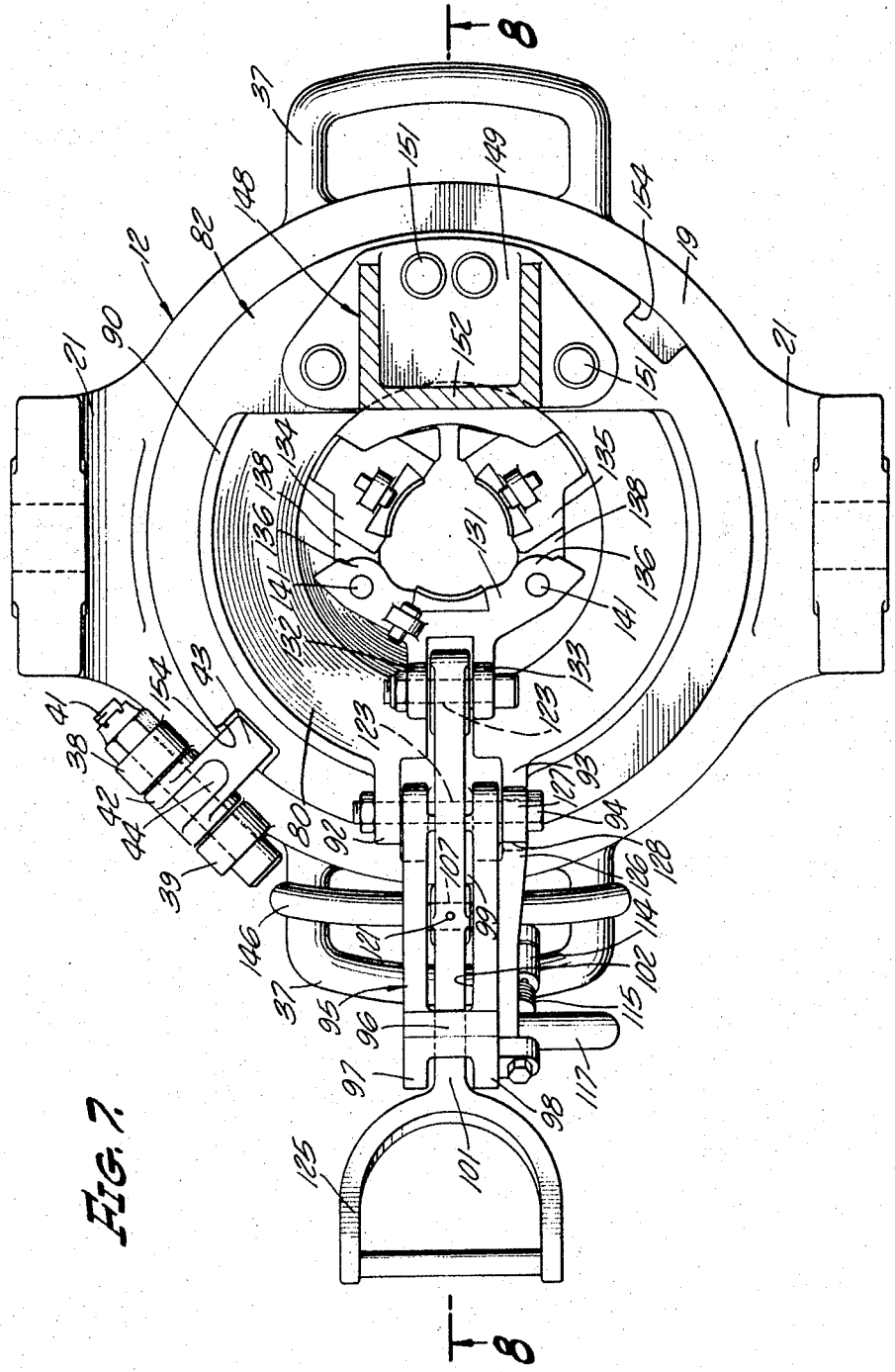

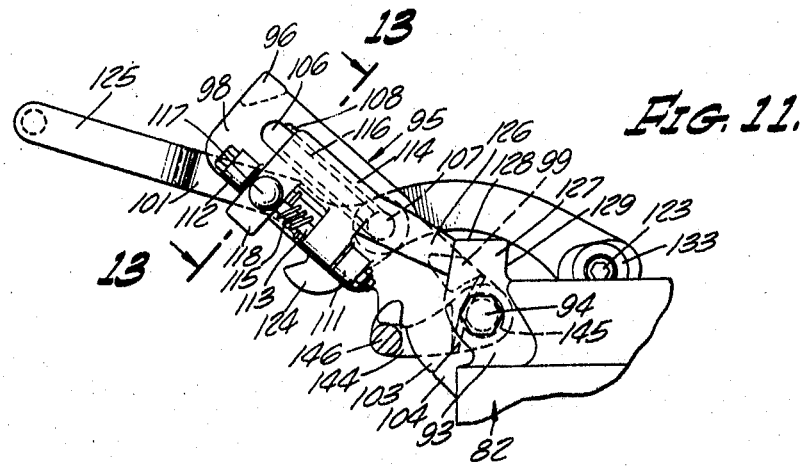
FIG. 11.
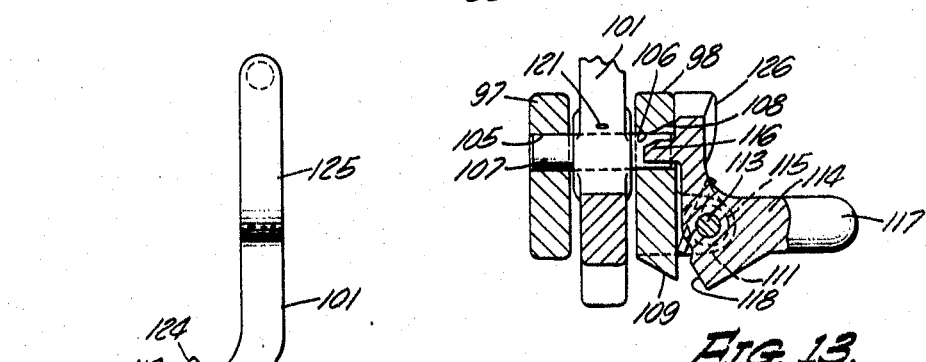
FIG. 13.
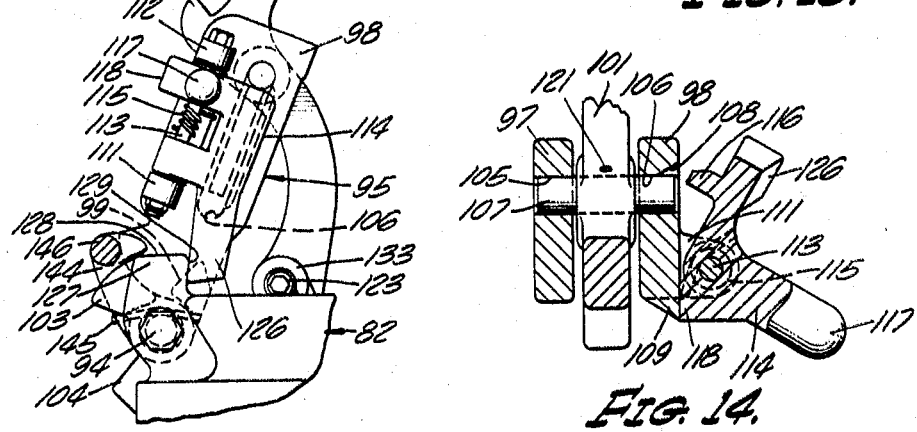
FIG. 12.
FIG. 14.

United States Patent Office 3,454,297
Patented July 8, 1969

3,454,297
CONVERTIBLE ELEVATOR
John W. Turner, Jr., Houston, Tex., assignor to Byron Jackson Inc., Long Beach, Calif., a corporation of Delaware
Filed Oct. 12, 1966, Ser. No. 586,218
Int. Cl. B66c 1/42
U.S. Cl. 294—90               19 Claims

ABSTRACT OF THE DISCLOSURE

A tubing elevator for collared, plain end and external upset types of tubing with rotatable, readily replaceable tubing supporting assembly, selectively interchangeable and convertible between flapper and slip types; improved positioning and actuating means for the flappers in the flapper type assembly, and improved positioning and guiding means for the slips in the slip type assembly.

Summary of the invention

This invention has to do with elevators for use in handling (hoisting, holding, and lowering) tubing, casing, and the like for bore holes such as, for example, oil wells. Features disclosed herein are also applicable to the supporting of tubing, etc. in spiders.

It is a primary object to provide a convertible elevator which may be rapidly converted from one to the other of various forms of supporting and gripping means for the handling of piping, tubing, casing and the like, making such elevator suitable for use with collared, plain end, and external upset types of tubing, etc.

It is frequently desired to handle collared tubing with a catch member which may be referred to as "flapper" means, against which the tubing collar may rest for support of the tubing. Such an arrangement, usually a plurality of flapper elements, supports but need not grip (and possibly distort) the tube. On the integral joint type of tubing, that is, the plain end type which has no collar, and on the external upset type of tubing which is merely tubing thickened externally at the end, the flapper type of support is not usually suitable, and a die or toothed type gripping means (herein usually termed "slip type") is needed.

Heretofore such elevators have not been constructed for use with a variety of pipe supporting means, and when an operator changes from handling one type of pipe to another, he has had to change to a separate elevator designed therefor. This has been expensive, time consuming, and tedious.

To eliminate the necessity of an operator having to stock a different type of elevator for handling each different type of tubing, it is an object of the present invention to provide an elevator in which different types of support or slip means may be selectively provided. In other words, the basic elevator body means may be provided with a tubing supporting assembly or insert having a flapper type of support means, or a tubing supporting assembly having slip type of gripping means, conversion from one to the other being a simple, rapid, operation that can be performed readily in the field by the operator.

With the present arrangement I have provided a basic elevator body or bowl structure adapted to receive, at the will of the operator an insert assembly comprising either a flapper type arrangement or a slip type arrangement, and which elevator is rapidly and easily convertible from one to the other of such tubing supporting assembly arrangements.

It is an object of the present invention to provide an improved form of flapper type insert assembly which cooperates with and is releasably retained in an elevator bowl. In this connection it is a feature to provide novel means of retaining the flapper type tubing supporting assembly in the bowl, and novel means of actuating the flappers to provide a readily releasable tubing supporting device.

It is a further object of the invention to provide an improved slip type tubing supporting assembly for a convertible elevator, which slip assembly has improved means for actuating and positioning the dies for cooperative action with the body of the elevator, and means retaining the slips properly positioned for selectively supporting and releasing the pipe.

In connection with the above mentioned objects for manipulating and retaining slip type gripping members in selected positions, it is an object to provide a lever means which is arranged to accomplish the above purposes without difficulty, but which lever means has means thereon and in connection therewith operating to retain it in proper position to prevent interference with the elevator support linkage or other equipment used on or in connection with the elevator, even though said lever means is rotated with respect to the elevator during rotation of the pipe or tubing supported in the elevator.

Also, it is an object to provide an improved means retaining said assembly in the elevator body, but which retaining means are readily releasable for removal of the assembly.

It is an object of the present invention to provide a replaceable means, herein referred to as a wear ring, which serves primarily as a lower tubing guide but may be readily exchanged for a wear ring having a different internal opening therethrough. Thus a wear ring for each size or diameter of tubing may be readily incorporated in the assembly by the operator.

It is still a further object of the invention to provide a tubing supporting assembly which is provided with an upper guide means on the top of the assembly and which is readily removable should use of such guide means not be desired, but which when present serves to center the tubing at the upper end of the assembly passage, and also stabilize the assembly. Further, the guide ring is designed to be readily replaced with a similar guide ring of internal diameter for use with another size of tubing.

Other objects and uses of the invention will appear in a more detailed description of the device forming the subject matter hereof to which reference is made for the purpose of ascertaining the same.

In the drawings:

FIG. 2 is a plan view, partially in section, on the lines 2—2 of FIG. 1, looking in the direction indicated by the arrows;

FIG. 3 is a side elevational view of the device of FIG. 2, the view being partially in cross-section and broken away substantially on the lines 3—3 of FIG. 2, looking in the directions indicated by the arrows in FIG. 2, and showing details of construction of the assembly;

FIG. 7 is a plan view corresponding to that of FIG. 2 but illustrating an arrangement using die elements for gripping tubing about its circumference, the tubing guide thereon being shown in cross-section;

FIG. 11 is a side elevational view illustrating details of the lever and latch means when the lever is in operational position with the gripping elements in the gripping position but with the lever in a position in which the tubing supporting assembly is non-rotatable;

FIG. 12 is a view similar to that of FIG. 11 but wherein the lever means is positioned with the gripping elements in operative position for gripping tubing in the elevator, the view illustrating details of the latch mechanism and lever positioning means when the lever and related mechanism is in position to permit rotation of the tubing supporting assembly;

FIG. 13 is a fragmentary cross-sectional view taken on lines 13—13 of FIG. 11 showing the lever positioning latch means in closed position, looking in the direction indicated by the arrows; and FIG. 14 is a view similar to that of FIG. 13 but showing the lever positioning latch means in the open or lever adjusting position.

Figure 1:
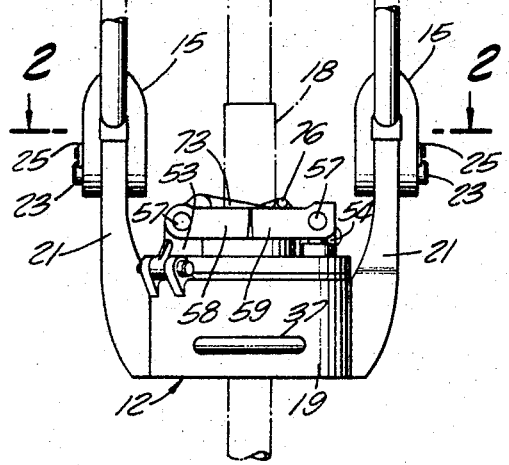
FIG. 1 is an elevational view, partially in broken lines, showing an elevator supported in operative position by a traveling block, tubing being worked being shown by a fragmentary broken line illustration.

Referring more in detail to the construction shown in the drawings, and referring first primarily to FIG. 1, there is shown an embodiment of the present invention in the form of elevator 12 supported on a traveling block assembly 13 by means of the links 14 and attaching clevises 15, attaching the elevator 12 to the links 14 and clevises 16, attaching the links 14 to the traveling block assembly 13. The traveling block assembly 13, clevises 16, and a portion of the links 14 are shown in broken lines for illustrative purposes.

Tubing 17, having a collar 18, is shown as extending through the elevator 12 in position supported by said elevator 12, in a manner hereinafter described. The tubing 17 is indicated in broken lines, as is the collar 18, the showing being for illustrative purposes to indicate how the device is used in a typical installation.

It is to be understood that when referring to "tubing" herein, the invention is equally applicable to other elongated objects such as pipe, casing, rods, and the like, but the term "tubing" will be used for illustrative purposes, although the invention is not intended to be limited solely to the handling of tubing.

Referring next primarily to the disclosures of FIGS. 2, 3, 4, 5 and 6, there is illustrated a flapper type of tubing supporting assembly primarily for use with collared tubing, as applied to an elevator. Such an assembly (as is also the case with respect to other disclosures herein) may be used with a spider without departing from the principals of the invention, and the description herein will be understood to encompass such a use even though the disclosure for illustrative purposes is for an elevator.

Referring to FIG. 3, the elevator 12 comprises a preferably ring shaped housing or body 19 with a vertical opening 20 therethrough and having the integral arms 21 which have in their upper end portions the holes 22 adapted to receive a pin or the like 23. A clevis 15 having corresponding holes 24 straddles the end of each arm 21 and the pin 23 retains the clevis in position to support the elevator 12 in the well-known manner. Each of the pins 23 is provided with suitable means retaining it against displacement, such for example as the retaining lug 25 which fits into a groove or recess of the pin 23 and which lug in turn is retained on the clevis by means of the bolt or the like 30. The arm 21, clevis 15 and the retaining means, form no part of this invention, but are here described for illustrative purposes to show an operative device and a typical elevator supporting arrangement.

As shown in FIG. 3, the basic elevator housing or body 19 has a vertical bore or opening therethrough with a bearing seat 26 on the radially inward circumference of the body, on which is positioned the bearing race 27 and annular bearing ring 28. The bearing ring 28 is held against displacement by means of a ring 29, which in turn is fastened to the body 19 by one or more bolts or cap screws 31. One or more lubrication channels 32, preferably having a fitting or nipple 33 for engagement with a grease gun or the like (not shown), is provided to facilitate the supplying of a lubricant to the bearing 27. In this connection O-ring seals 34, 35, and 36, retard or prevent the leakage of lubricant from the bearing area and prevent the entry of dirt or the like. With this arrangement, the bearing ring 28 is rotatably supported in the throat or central vertical opening through the body 19, as is clearly evident from the drawings, and for the purpose hereinafter clearly apparent.

The body 19 is usually provided with the handles 37 which are for the convenience of the operator in positioning and manipulating the elevator assembly 12.

Figure 6:
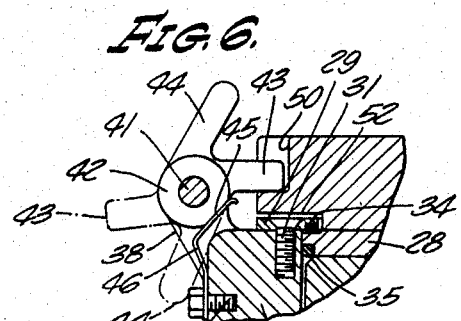
FIG. 6 is a fragmentary side elevational view, partially in cross-section, and taken on the lines 6—6 of FIG. 2 looking in the direction indicated by the arrows.

As is evident from FIG. 2, and referring also to FIG. 6, there is provided a pair of spaced lugs 38 and 39 on the upper outer circumference of the body 19, which lugs are drilled or otherwise perforated to receive the trunnion bolt 41 extending between the lugs 38 and 39. Inserted between the lugs and mounted on the bolt 41 is an anti-swivel lock means with a barrel 42, the use or purpose of said lock means being to prevent undesired rotation of the tubing supporting assembly hereinafter described, and the operation of which will be clear from the drawings and the description herein. This anti-swivel lock barrel 42 has, as an integral part thereof, the finger 43 and the handle 44. The finger 43 is movable into and out of locking engagement by rotation of the barrel 42, into a slot 50 in the tube supporting assembly to prevent the rotation of the latter, and the handle 44 comprising a convenient means of rotating the lock barrel and thus the finger 43 to position the latter into or out of engagement or locking posititon. As evident from FIG. 6, the lock barrel is provided on one side with a flattened area 45, against which the leaf spring 46 rests when the lock finger 43 is in the engaging or locking position to prevent its accidental displacement by vibration or otherwise. As shown in FIG. 6, the solid line illustrates the lock means in engaged or locking position and the broken lines show it in disengaged position. The spring 46 is attached to the body 19 by means of the cap screw 47.

The above described basic elevator body assembly comprises, with the insert retaining means hereinafter described, the structure which receives interchangeable types of tube supporting assemblies, two forms of which are hereafter described.

Referring again primarily to FIG. 3, the flapper type of pipe supporting assembly adapted for insertion in the opening of the body 19 is disclosed. As is evident from the drawings, and particularly from the cross-sectional view of FIG. 3, the pipe supporting assembly has a base 48 which may be loosely referred to as a sleeve having a bore or vertical passage 49 therethrough for the reception of tubing being worked by the elevator. In cross-sectional configuration the base 48 has a skirt portion 51 the outer circumference of which is adapted to fit into the opening 20 through the body 19 of the elevator, and abut against the vertical surface of the bearing ring 28. Preferably the skirt portion 51 has sufficient clearance in its outer circumference with respect to the body 19 to permit free rotational movement of the base 48. The base 48 in its upper portion extends radially outwardly to form a shoulder which extends over the top of the body 19 and ring 29, and seats on the top or horizontal portion of the bearing ring 28 whereby the bearing ring 28 carries the weight of the tubing supporting assembly and tubing supported therein. Preferably the base 48 is grooved or cut away on the bottom surface of its radial outward extension as shown at 52 to provide clearance for the retainer or ring 29.

Located diametrically opposite each other on either side of the vertical passage 49, are the upstanding lug portions 53 and 54 (see FIG. 2) which lug portions are each provided with holes 55 to receive a journal pin 57 for each lug on which are rotatably mounted the flappers 58 and 59.

Preferably, the base 48 is formed so that its lower radially inner portion is bell shaped or in the form of a truncated cone to expedite the stabbing and centering of tubing. The configuration of this portion of the passage through the base is clearly apparent from the sloping wall 61. Similarly, as indicated at 62 the upper portion of the vertical passage 49 is flared at the top, so that intermediate the top and bottom of said passage and spaced a short distance from the top, the inner circumference is necked down or reduced to aid in centering tubing being worked, to strengthen the base 48 and for other reasons which will appear.

On its upper surface the base 48 has a horizontal ledge or seat 63 on each side beneath the flappers (or it may be annular), which provides a support or surface on which the flappers 58 and 59 rest when in their horizontal or load supporting position.

Each of the flappers 58 and 59 is provided with a bifurcated portion at the end thereof to be attached to the base 48, the bifurcations being perforated to receive the trunnion pin 57, and the bifurcations of each flapper fitting on either side of the lug 53 (the bifurcations of the flapper 59 fit on the lug 54) whereby a hinge action is obtained when the pin 57 is inserted through the perforations of the bifurcations and the hole in the respective lug portion. In other words each flapper is mounted to be rotated around the pin and retained in position by the pin 57 through lug 53 or 54 as the case may be. The flapper body extends radially inwardly to a position substantially to the center line of the vertical passage 49 through the base, and the outer end portion of each flapper is recessed as shown at 64 with respect to flapper 58, and 65 with respect to flapper 59, each recess being of a diameter width substantially equal to the outer diameter of a tube to be retained therein and of a radial depth substantially equal ot the radius of such tube. The spacing between the adjacent ends of the flappers when closed (horizontal) is preferably only sufficient to allow clearance for raising and lowering the flappers.

As shown in FIG. 3 each flapper has a depending skirt portion 66 which is adapted to fit into and rest close to or against the slanting or conical wall 62 of the base 48. The primary purpose of such a skirt is to prevent misalignment of the flappers with respect to each other. The bottom surface of the flapper extending back from the skirt 66 seats on and is supported by the seat 63 formed on the upper surface of the base 48. Thus when tubing is being supported by the flappers, the weight of the tubing is supported by the seat 63. With the depending skirt 66 adapted to engage or engaging the conical surface 62, any force tending to misalign the flapper 58 (or the flapper 59 as the case may be) will be countered by the skirt and its coacting seat. Usually the skirt will not actually engage the conical surface 62 except where the flapper is misaligned, but will engage the conical surface to re-align the flapper if the latter is not in its proper position.

Means have been provided to retain the flappers in the desired attitude, whether horizontal or vertical. The flapper 59 has been provided with a rounded portion on its rear lower edge as shown at 67. Below the pin hole of one leg of the bifurcated portion of flapper 59, there is provided a detent 68 mounted in the top of the base 48 and positioned to bear against the adjacent surface of the flapper 59 immediately below the position of the pin 57. Preferably the top of this detent is flat and has a reasonably large area, for example a diameter comparable with the diameter of the pin 57 or larger. Thus when the flapper 59 is in horizontal position as shown in FIG. 3, the detent restrains the flapper against accidental displacement and requires a force sufficient to overcome the detent spring in order to raise the flapper 59. Should the flapper 59 be in vertical position which position would allow the movement of tubing through the opening 49, the detent 68 will rest against the rear surface 69 of the flapper and exert pressure restraining the flapper 59 in vertical position. Since the flappers are operatively fastened together, as hereafter described, whereby they are retained in similar attitudes (vertical or horizontal), retention of the flapper 59 in one attitude by the detent operates to retain the flapper 58 in a corresponding attitude.

Figure 4:
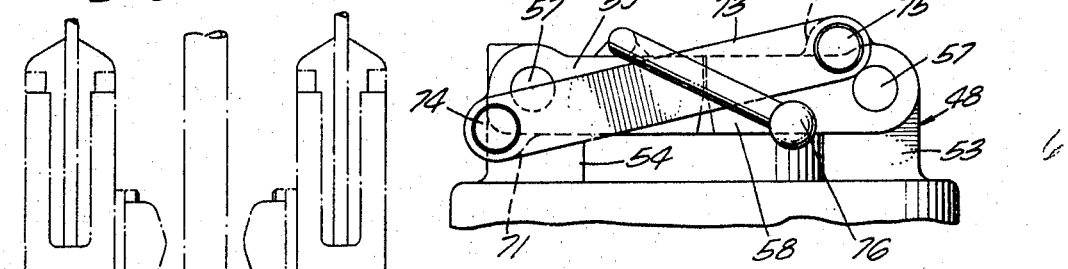
FIG. 4 is a fragmentary elevational view illustrating a flapper type assembly for tubing support as shown in the elevator of FIG. 1, the view showing the flappers in horizontal or closed tube supporting position, and being partially in dotted lines to show details of the parts.
Figure 5:
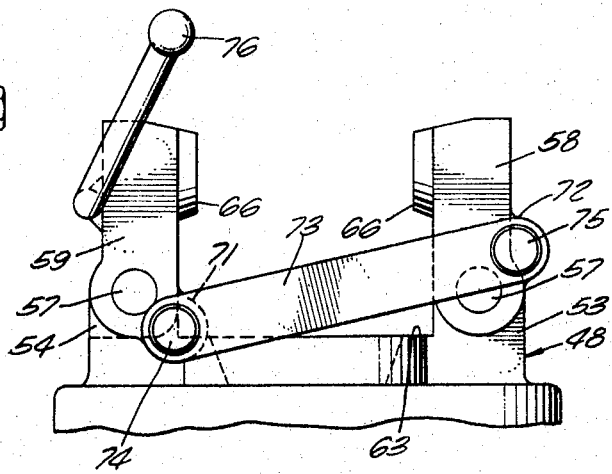
FIG. 5 is a view similar to FIG. 4 but wherein the flappers forming the tubing supporting elements are in vertical or open position.

Referring next to the mechanism for actuating the flappers, and referring primarily to FIGS. 2, 4 and 5, it is to be observed that the flapper 59, in the arrangement shown in the drawings has a depending stud 71 which is integral with the flapper 59 and extends downwardly and rearwardly with respect to the rear edge of such flapper, thus being offset downwardly and rearwardly. The stud 71 is thus eccentric with respect to the center of the pin 57 about which the flapper rotates. The flapper 58 is likewise provided with an integral offset stud 72 which, as appears from FIG. 4, is positioned upwardly and inwardly with respect to the pin 57 on which the flapper 58 rotates, and which stud 72 is eccentric with respect to the center of said pin.

The link 73 is rotatably attached to the stud 71 by means of the link pin 74, and is rotatably attached at its other end to the stud 72 by means of the link pin 75.

Preferably there is attached, by welding or the like to one of the flappers, here shown as the flapper 59, the actuating lever or handle 76. Thus by imparting an arcuate movement to the handle 76, raising the handle upwardly, the flapper 59 is raised to a vertical position. Such movement causes the link 73 to exert force on the link pin 75 and correspondingly rotate the flapper 58 about the pin thus raising the flapper 58 to a vertical position or attitude as clearly shown in FIG. 5. Likewise, to lower both flappers, the operator may grasp the handle 76 and move it arcuately downwardly causing the flapper 59 to close and the link 73 to pull the flapper 58 to a similar closed position.

It is to be noted that the tubing supporting assembly above described is easily inserted into the body assembly 19 by lowering the tubing supporting assembly into the vertical opening 20, in the body assembly 19, whereupon the base 48 of the tubing supporting assembly will seat on the bearing ring 28 as above described.

A simple and convenient retaining means to prevent the accidental displacement of the tubing supporting assembly from the base assembly 19, comprises a split ring, or if preferred, a plurality of ring segments, 77 which may be readily insertable laterally into a mating groove 78 of the base 48, and which ring 77 is retained in place by one or more cap screws 79. Thus when the tubing supporting assembly above described (as is the case with other tubing supporting assemblies such as the one hereinafter described) is placed in the elevator body 19, the operator can readily insert the ring 77 in position and attach it to the bottom of the elevator body 19, as indicated in FIG. 3. For the purpose of providing a protected area for the ring 77 and cap screws 79, the elevator body 19 may be recessed upwardly around its inner diameter with an annular recess 81, which recess is preferably of sufficient radial width to allow the operator to readily manipulate the ring 77 and cap screws 79. It may be noted that the groove 78 is large enough to avoid binding on the ring 77 so that rotation of the base 48 in the vertical opening 20 will not be inhibited by the ring 77, but there is provided only a minimum amount of clearance between the ring 77 and the bottom of the groove 78 in order to stabilize the base 48 against upward displacement.

Referring next to the tubing supporting assembly of FIGS. 7 through 14, there is here shown an elevator tubing supporting assembly insert of the type used to grip tubing with dies or toothed members, and which insert or tubing supporting assembly may be readily substituted by the operator in lieu of the flapper type tubing supporting assembly above described.

This tubing supporting assembly insert, herein sometimes referred to as "slip type" tubing supporting assembly, is adapted to be seated in the vertical opening 20 of the elevator body 19, and be held therein against upward movement or displacement by means of the ring 77, essentially the same way as above described with respect to the construction shown in FIGS. 1 through 6 inclusive.

Figure 8:
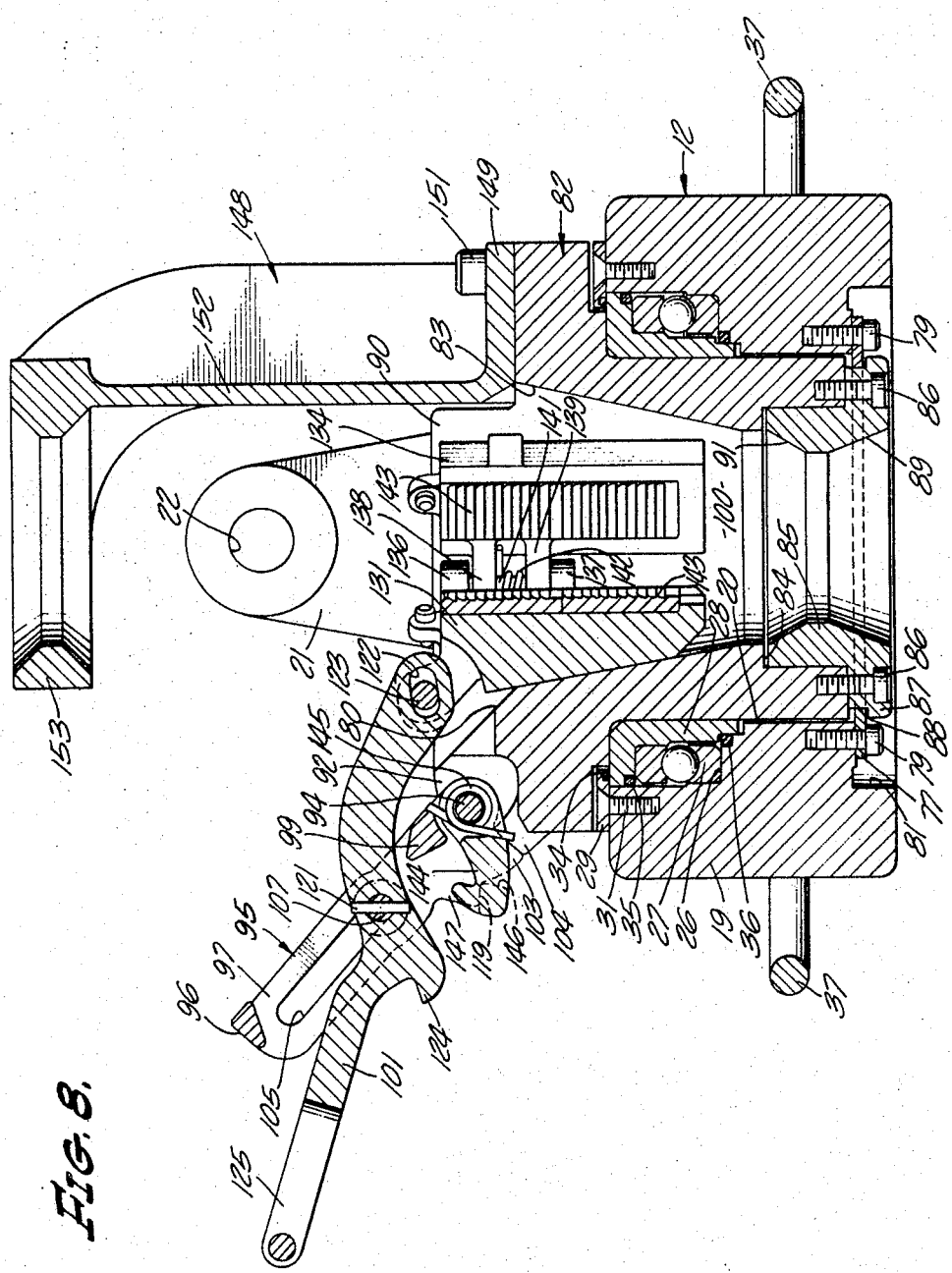
FIG. 8 is an elevational cross-sectional view taken on the lines 8—8 of FIG. 7, looking in the direction indicated by the arrows.

Referring first to FIGS. 7 and 8 primarily, there is shown the previously described elevator body assembly 19 having the bearing assembly 27 and bearing ring 28 together with the O-ring seals and the retaining ring 29, all of identical or similar construction to that above described in connection with FIG. 3 in particular.

As shown in FIG. 8, in detail, I have provided a base 82 for the slip type tubing supporting assembly which is adapted to seat upon the bearing ring 28, in the same way as the base 48 of the flapper type tubing supporting assembly above described. On its left hand side when viewed in FIGS. 7 and 8, and extending for a distance on the order of 150 degrees of the circumference of the base on each side of a center line (it can extend all the way around the opening if the tubing guide is omitted) diametrically through the axis of the base 82, the base is provided with a raised lip or flange 90 on the top thereof. This lip 90 surrounds the top of the bore or vertical passage 100 through the base and slopes downwardly and inwardly on its internal circumference to form a ramp 80 with a slope on the order of 45 degrees for purposes hereinafter apparent.

As intimated above, the base 82 is provided with a bore or vertical passage 100 therethrough, the upper portion of which, beginning at the bottom of the lip 90 where it intersects the vertical passage, and extending circumferentially around the vertical passage, the sides of the vertical passage slopes downwardly and inwardly in the form of an inverted truncated cone, as indicated at 83, preferably the slope thereof being on the order of 10 degrees from the vertical.

The lower portion of said vertical passage and approximately one-third of the distance from the bottom of the base 82, said base is preferably recessed laterally as shown at 84 to accommodate a wear ring 85 which is attached to the base by any convenient means, such for example as the cap screws 86 through an outwardly flanged portion 87 of the wear ring. This flange 87 is in turn preferably grooved or recessed laterally inwardly at its upper edge as shown in the drawing to provide, with the bottom of the base 82, a circumferential groove 88 to receive the split ring 77 for retention of the base 82, as above indicated, against upward displacement. This arrangement is similar to that of FIG. 3 except that the wear ring flange 87 forms a portion of the retaining groove whereas in the construction of FIG. 3 the groove 78 was wholly formed in the base 48.

Internally, the wear ring 85 is provided with the lower conical surface 89 and the upper inverted conical surface 91, which results in the internal diameter extending radially inwardly to both strengthen the ring and assist in the centering of the tubing being worked. The downward and outward flare of the surface 89 aids in stabbing the tubing 17 and guiding it through the vertical passage in the tubing supporting assembly. Such wear ring is preferable to the form of base shown at 51 in FIG. 3, in that wear rings of various internal diameters may be used for various sizes of tubing—a wear ring of proper internal diameter being desired for each size of tubing to aid in centering the tubing and stabilizing the elevator—and in that the elevator assembly frequently receives rough usage and the interior surface is subject to damage. Should the wear ring 85 be damaged, or should another size be desired, it can be readily replaced in the obvious manner.

On the top surface of the base 82 (see FIGS. 7 and 8) and formed integrally therewith, and (if desired) as lateral extensions of the lip 90, there is provided a pair of mounting lugs 92 and 93 which are spaced apart and drilled or otherwise perforated to receive a pivot bolt 94, on which is journaled for pivotal or rocking movement the upwardly extending arm 95.

This arm 95 is preferably comprised of parallel bar portions 97 and 98, joined by the integral cross-connector portion 96, preferably of less thickness than the bars 97 and 98, the cross-connector 96 being near or at the outer end of the arm 95. Also, the bars 97 and 98 are integrally joined a short distance from their other ends by the lower cross-connector 99. These two bars 97 and 98 are spaced apart as indicated in FIG. 7, a sufficient distance to accommodate a lever 101 inserted through the slot or space 102 as hereafter described. The bars 97 and 98 of the arm 95 are drilled at their lower ends as shown in FIG. 7 to receive pivot bolt 94 whereby the arm 95 is pivotally mounted on the base 82 by the lugs 92 and 93 and the pivot bolt 94. The arm 95 lies between the lugs 92 and 93. As will be clear from FIGS. 8, 11 and 12, an arm stop 103 is provided on the bottom end portion of the arm 95, preferably one on each of the bars 97 and 98, which stop 103 is adapted to seat against a mating stop 104 in the form of an integral upstanding lug on the base 82 to limit the arcuate rearward and downward pivoting movement of the arm 95 to that of the position shown in FIG. 8.

The arm 95 is provided with elongated parallel axial slots 105 and 106, one each extending laterally through the side of each bar 97 and 98, the slot 105 for the bar 97 being aligned with the slot 106 for the bar 98. The slots 105 and 106, as will be pointed out more in detail hereafter, receive the wrist pin 107 supporting the lever 101, which wrist pin is adapted to ride up and down in the slots 105 and 106.

The slot 106 as is most clearly shown in FIGS. 13 and 14, has a ramp surface 108 on its outer top surface to facilitate the entry thereinto of a latch flange to be described more in detail hereafter.

On its lower outer edge the bar 98 is provided with a tab 109 for purposes hereinafter recited.

Extending laterally outward from the bar 98 is a pair of spaced integral ears 111 and 112 which are drilled or otherwise perforated axially of the arm 95 to receive a trunnion bolt 113 on which is mounted the latch 114 urged into the closed position, best represented by FIG. 13, by the spring 115. This latch 114 is rotatable about the trunnion bolt 113 and has an inwardly extending elongated flange 116 which is adapted to extend into the slot 108. Integral handle 117 will enable the operator to rotate the latch 114 to the flange 116 disengaged position and the latch 114 has a stop 118 adapted to contact the tab 109 to limit its movement.

The arm 95 is also provided, on the bottom of either or both bars 97 and 98 with a stop means 119 the purpose and operation of which will be hereafter explained.

The lever 101, as probably best seen in FIGS. 7, 8 and 11, and as mentioned above, extends through the slot or space 102 between the bars 97 and 98, preferably below the cross-connector 96 and above the cross-connector 99. Intermediate its upper and lower ends (see FIGS. 7, 8, 13 and 14) there is inserted laterally through the lever 101, the wrist pin 107, which wrist pin seats in the slots 105 and 106 in the arm 95 and is adapted to ride up and down between the top and bottom of said slots. The wrist pin 107 is retained in the lever 101 by means of the pin or set screw 121 which is seated in a hole drilled in the lever 101 and wrist pin 107. This wrist pin 107 forms a bearing or fulcrum supported by the arm 95 about which the lever 101 may be rocked or rotated. At its lower end the lever 101 is provided with a slotted hole 122 to receive a bolt 123 on which bolt is mounted a set of slips (hereafter described), and which bolt 123 forms with the slot 122 a lost-motion connection between the lever 101 and the slips.

Positioned rearwardly from the wrist pin 107 on what may be termed the "foot portion" of the lever 101 there is integrally formed thereon a spur or hook portion 124. At its upper end the lever 101 is preferably provided with a handle 125 here shown as an ordinary "D-shaped" handle which may be easily grasped by the operator actuating the lever 101 for pivotal movement about the wrist pin 107.

Referring again to the latch 114 (and primarily to FIGS. 11 and 12) on the bar 98 of the arm 95, it is noted that this latch is provided with a downward extension forming the stop element 126 which, when the latch 114 is in closed position, either abuts against the stop 128 on the radially outward edge of the upwardly extending lug 127 or overlies and seats against the radially inward stop surface 129 of the lug 127. This lug 127 is, in the example shown, an upwardly extending integral portion of the mounting lug 93 on the base 82.

The wrist pin 107 serves to position the lever 101 with respect to the arm 95, and as mentioned above is carried by the slots 105 and 106. When the arm 95 is in its rearward position shown in FIGS. 8 and 11, the wrist pin is in the lower end of said slots, and is retained there by the elongated flange 116 of the latch 114 which is rotated into slot 106. FIG. 13 shows the flange 116 in position in slot 106, and it is clear from FIG. 11 how the wrist pin is held at the lower end of said slot where it forms a rotatable support for the lever 101. When the arm 95 is in its inward position as indicated in FIG. 12, the wrist pin 107 has been moved to the upper limit of the slots 105 and 106, by retracting the flange 116 as indicated in FIG. 14 and raising the lever. As soon as the wrist pin has reached its upper limit of movement the flange 116 is again returned to the slot 106 and the top of the flange serves as a bearing support holding the wrist pin firmly positioned in the upper end of said slot as indicated by the arrangement of FIG. 12. In the two views of FIGS. 11 and 12, the slips attached to the lever 101 are in their downward or gripping position and the arm 95 is held in the desired position by means of the stop element 126 coacting with the lug 127 as above described.

Figures 9, 10:
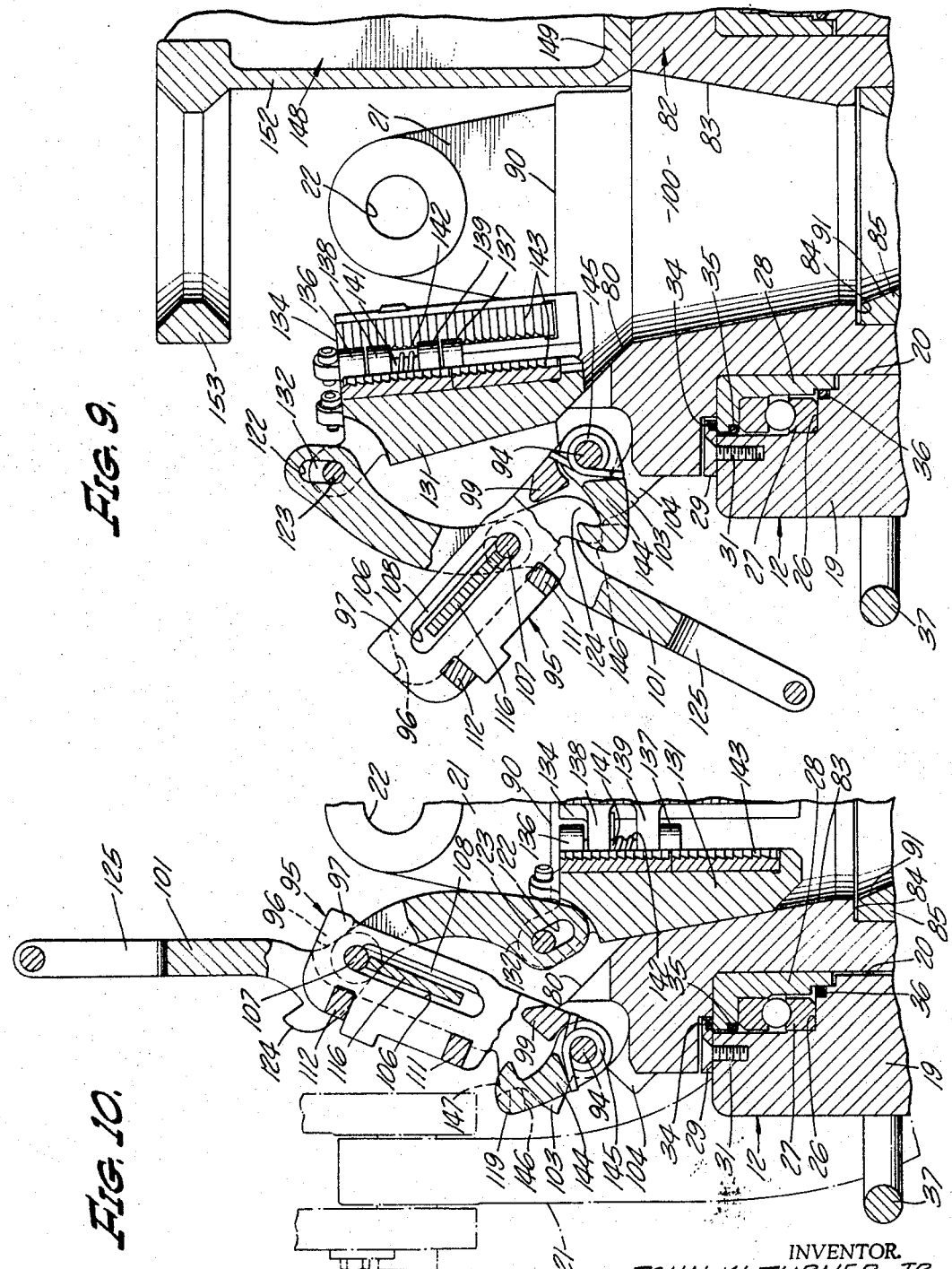
FIG. 9 is a fragmentary elevational view, partially in cross-section, of the device of FIG. 7 illustrating details of the means for manipulating the gripping elements and other details of construction.
FIG. 10 is a fragmentary front view partly in cross-section, corresponding generally to FIG. 9 but illustrating the gripping means in operational position to grip the tubing, and other details of construction and operation.

Referring to the arrangement shown in FIGS. 7, 8 and 9 there is here disclosed a slip assembly comprising the center slip 131 which has the upwardly and outwardly extending ears 132 and 133 which are drilled to receive the bolt 123 by means of which the center slip 131 is attached to the lower end of lever 101 with a lost-motion connection. The center slip 131, as is obvious, depends from the ears 132 and 133. On each side of the center slip 131 is attached another slip, here shown as the slips 134 and 135. Ths attachment may be by any convenient means but is preferably (as shown best in FIG. 8) by means of brackets 136 and 137 extending laterally from the side of the center slip 131 (only one set of brackets being shown) and mating brackets 138 and 139 extending from the side of the adjoining slip (here shown as slip 134), the brackets 136, 137, 138 and 139 being perforated and a hinge pin 141 extending therethrough to support the slips firmly together but allowing rotary or swinging movement about the pin 141. Preferably also the coiled spring 142 having its end portions bearing respectively against the center slip and the side slip urges the side slip (here shown as slip 134) to swing outward with respect to the center slip. An identical construction (although perhaps not clear from the drawings) is provided for attaching the slip 135 to the center slip 131. The respective slips each has a die or gripping member 143 mounted and retained therein in any convenient fashion, such dies, and the mounting means therefor, being well-known in the art.

With this arrangement, the slips may be lowered into the vertical passage in which lowering action the lever is rotated about the wrist pin 107 so that its lower end moves downward allowing the slips to be guided down the ramp 80 and onto the surface 83 of the bore, a movement overcoming the resistance of the spring 142 and causing the gripping surfaces of the dies 143 to engage tubing 17 positioned in the vertical passage 100 about the circumference of the tubing in a gripping action. Weight of the tubing will cause the dies to grip more firmly by reason of the inward pressure created by movement of the slips downward on the slope of the base.

The slips 131, 134 and 135 may be retracted from the gripping position by pressing the handle 125 of the lever 101 downward causing the lower end of the lever 101 to swing up about the wrist pin 107 as a fulcrum and thus lifting the slips upward where they swing apart under the influence of the spring 142 and ride the conical slope 83 of the base onto the ramp 80 to the position indicated in FIG. 9. In this position the slips are out of the vertical pasage 100 and out of the way of the tubing which may be moved through the vertical passage 100 without hindrance.

A catch 144 is journaled on the pin 94 beneath the lever 101, which catch has a hook engaging portion on its outer end. The catch 144 is preferably urged upwards by means of the spring 145, and when the lever 101 is in the position indicated in FIG. 9, this catch engages the hook portion 124 and retains the lever 101 in the position of FIG. 9, whereby the slips 131, 134 and 135 are located out of tubing engaging position and rest on the ramp 80 of the base.

The catch 144 is provided with a catch handle 146 (see particularly FIG. 7) which extends on both sides of the latch so that it may be grasped for operation by the operator for the purpose of releasing the catch 144 from engagement with the hook portion 124, thus allowing the lever handle to swing upward. The arm 95 is provided with a stop 147 which engages the handle 146 to limit the travel of the catch 144 so that it will be in position at all times to engage the hook portion 124 when the lever is moved into proper position. This engagement of the hook portion 124 is automatic unless the handle 146 is used to displace the catch 144, the catch 144 having a rounded surface at its end and the hook portion being correspondingly rounded to provide a ramp arrangement guiding the catch 144 into hook engaging position with hook portion 124 as the lever rides down against the catch. As intimated above, the catch may be disengaged by means of the handle 146 whereupon the lever 101 is free to swing upwardly on its radially outer end.

Referring to FIGS. 7, 8 and 9 and particularly to FIG. 9, a rod guide 148 may be provided to aid in centering tubing passing through the vertical passage 100 of the tubing supporting assembly, and for the additional purpose of stabilizing the elevator 12 and its included tubing supporting assembly with respect to the tubing. This rod guide is not essential and may be dispensed with, but as here shown comprises the attaching base portion 149 which is attached in any convenient manner such as by cap screws 151 to the top of the tubing supporting assembly base 82, preferably diametrically opposite the arm and lever mechanism whereby it will be out of the way of the slips 134 and 135. The rod guide 148 in the construction shown has a vertical post 152 which may be in the form of a channel iron, on the upper end of which and extending laterally over the vertical passage through the base 82 is a guide ring 153 the center opening of which is adapted to receive and guide tubing. Since it is preferable for such a rod guide to have an opening only slightly larger in internal diameter than the tubing passing therethrough, rod guides of different sizes may be selected and readily substituted by the operator.

Inasmuch as this arrangement is intended for use in an elevator or the like assembly having the body means such as the body 19 of the elevator disclosed in FIGS. 3, etc., and since said elevator body is provided with an antiswivel lock means such as the lock having the barrel 42, finger 43 and handle 44, the upper outer periphery of the base 82 is provided with one or more slots 154 adapted to receive the finger 43 on the latch means to prevent rotation of the base assembly when the finger 43 is in the slot 154.

With the above devices in mind, the operation may be summarized generally as follows:

The operator, having available the basic elevator structure including the body 19, determines from the type of tubing being worked whether he desires a tubing supporting assembly of the flapper type described in FIGS. 2 through 6, or the tubing supporting assembly of the slip type described in FIGS. 7 through 14. Assuming that he is working collared tubing, he normally would select the flapper type structure of FIGS. 2 through 6. This flapper type tubing supporting assembly would be inserted into the vertical opening 20 in the body 19, with the base 48 of the tubing supporting assembly resting on the bearing retainer ring 28, and with the split ring 77 inserted in the groove 78 to retain the assembly in the body 19. The flappers 58 and 59 would be moved into the vertical position by means of the handle 76 and retained therein by the detent 68 pressing against the surface 69 of the flapper 59. In this position the collared tubing may be moved through the elevator or the elevator may be moved vertically on a string of tubing, as the case may be.

When it is desired to support the tubing in the elevator, the flappers 58 and 59 are moved to the closed position as shown for example in FIG. 3, whereupon the collar 18 of the tubing will seat on top of the flappers 58 and 59 and the tubing will be supported thereon.

Should it be desired to rotate the tubing, for such purpose for example as to make-up or disconnect the tubing from the string, the base 48 is free to rotate with respect to the body 19, the rotating tubing supporting assembly being carried by the bearing 27 and its retainer ring 28. Should it be desired to restrain the tubing against rotation, the finger 43 is moved into the slot 50 in which position the tubing supporting assembly base 48 is locked to the body 19 and rotation is prevented.

The flappers 58 and 59 are moved in unison to the selected attitude (vertical or horizontal) by means of the handle 76 on the flapper 59 and the link 73 mounted on the off-center trunnions 74 and 75, whereby movement of the handle 76 actuates the linkage so that both flappers move in unison.

Should the operator desire to use the slip type supporting assembly described in FIGS. 7 through 14 inclusive, it is merely required that he remove the cap screws 79 and the split ring 77, whereupon the tubing supporting assembly may be lifted out of the vertical opening 20 and the slip type tubing supporting assembly of FIGS. 7 through 14 inclusive may be seated in the vertical opening 20 of the body 19. The split ring 77 is again fastened into position on the body 19 and rides in the slot 88 whereby the slip type tubing supporting assembly is held in position in the body 19.

Preferably the base 82 has assembled therein the wear ring 85 which forms a portion of the slot or groove 88 and which wear ring is attached to the bottom and becomes a part of the base 82 of the slip type tubing supporting assembly.

This base 82 carries the arm and lever mechanism 95 and 101, and the lever 101 has mounted on the end thereof the slips 131, 134 and 135. The lever 101 is journaled in slot means in the arm 95 by means of a wrist pin 107, for positioning either in the bottom of said slot means or at the top of said slot means and for retention in the selected position by a latch and integral flange means 114 and 116 respectively. The flange means 116 supports the wrist pin in the upper part of the slot when the wrist pin is positioned there, or holds the wrist pin in the lower end of the slot when there positioned.

The operator normally, after inserting the tubing supporting assembly of the slip type in the body 19, depresses the handle of the lever 101 the arm 95 being in its rearmost position all as shown in FIG. 9. The catch 144 engages the hook portion 124 and retains the lever 101 in its down position, the wrist pin on which said lever is journaled being located in the downward end of the slots 105 and 106 and retained therein by the flange 116. In this position the slips 131, 134 and 135 have been moved up onto the ramp 80 of the body 82 whereby the vertical passage 100 is cleared for the movement of tubing therethrough. The elevator is then stabbed or otherwise placed on the tubing whereby said tubing extends through the vertical passage 100 and (if provided therefor) the tubing guide 148. Thereupon the catch handle 146 of the catch 144 is pulled downward to release the hook 124 of the lever 101 allowing the lever 101 to move upward on its outer end about the fulcrum of the wrist pin 107 whereupon the slips 131, 134 and 135 move down the ramp 80 into the opening 101 and engage the outer circumference of the tubing. Further movement of the elevator upwardly or the tubing downwardly, will cause the slips to move downward and inward on the conical surface 83 and grip the tubing. The arm 95 and lever 101 are then, in the positions shown in FIGS. 8 and 9, in the way of rotation of the base 82 in the body 19, for the reason that in such position they would strike the arms 21 of the elevator body 19 or other mechanisms in the vicinity. In the event it is desired to rotate the base 82, the latch 114 and flange 116 are moved out of the position wherein the flange 116 is in the slot 106 of the arm 95, and the handle 125 of the lever 101 is moved upwardly causing the wrist pin 107 to move upward in the slots 105 and 106 to the top position, after which the flange 116 is moved back into the slot 106 under the influence of the spring and handle of catch 114. In the meantime, arm 95 has been moved to a more or less vertical position as indicated by FIG. 12, the stop 126 having been positioned inside the lug 127 when the catch 114 was returned to the slot engaging position of flange 116. Thus the handle of the lever 101 is maintained upright and the arm 95 is vertical or slanting slightly inwardly, so that rotation of the base upon which they are mounted will not be impeded by their striking surrounding equipment and mechanism. To permit such rotation, the finger 43 is disengaged from the slot 154 whereupon the tubing supporting assembly base 82 is free to rotate with rotation of the tubing therein.

It is noted that two different (lower and upper) guide means for the tubing are provided. The replaceable wear ring 85 which is removably attached at the bottom of the vertical passage 100 and which may be selected in accordance with the desired internal diameter to correspond with the size of the tubing being worked, and the replaceable or removable guide ring 148 positioned on the top and above the base 82 and aligned with the vertical passage 100. Should the guide ring 148 not be desired, it may be readily removed, or should a different size of guide ring 148 be desired to accommodate a different size of tubing it may be substituted for the previously attached guide ring.

When occasion demands, it is noted that to replace or to substitute tubing supporting assemblies in the elevator body 19, it is merely necessary to disengage the split ring 77, lift out the tubing supporting assembly therein, and set in place the substitute, replacing the split ring 77 for retention of the tubing supporting assembly in the body 19.

While the specific details of the invention have been herein shown and described, changes and alterations may be resorted to without departing from the spirit of the invention as defined in the appended claims.

What is claimed is:

1. A convertible elevator for tubing comprising in combination (a) an elevator body having a vertical opening therethrough, (b) a readily replaceable tubing supporting assembly in said vetrical opening and having a vertical passage through said tubing supporting assembly; said assembly having tubing supporting means operable to hold and release tubing extending through said vertical passage, and (c) means on the said tubing supporting assembly comprising a groove in said tubing supporting assembly operative with means on the bottom portion of said elevator body comprising a readily removable split ring attached to the bottom of said body and mating with said groove whereby said tubing supporting assembly is releasably retained in said body.

2. A convertible elevator as set forth in claim 1, wherein said tubing supporting assembly is rotatable with respect to said elevator body.

3. A convertible elevator as set forth in claim 2, wherein bearing means are operatively positioned between said elevator body and said tubing supporting assembly, whereby said assembly is freely rotatable with respect to said elevator body for rotation in concert with tubing supported in said tubing supporting assembly.

4. A convertible elevator as set forth in claim 2, wherein a releasable rotation preventing means is provided comprising a releasable lock on said elevator body and lock engaging means on said tubing supporting assembly, whereby engagement of said lock means with said lock engaging means holds the tubing supporting assembly against rotation with respect to the elevator body.

5. A convertible elevator as set forth in claim 3, wherein the tubing supporting assembly has flapper means releasably engaging and supporting said tubing.

6. A convertible elevator as set forth in claim 3, wherein the tubing supporting assembly comprises slip means operative to engage, support, and release, said tubing.

7. A convertible elevator for tubing comprising in combination:

An elevator body having a vertical opening therethrough;

A readily replaceable tubing supporting assembly in said vertical opening and having a vertical passage through said tubing supporting assembly, said assembly having tubing supporting means operable to hold and release tubing extending through said vertical passage;

Means releasably retaining said assembly in said elevator body vertical opening;

Said tubing supporting assembly being rotatable with respect to said elevator body;

Said elevator body being recessed radially outward on its inner circumference to form a bearing support and having a bearing race mounted in said recess;

A bearing ring seated on said bearing race with means retaining said bearing ring on said race;

Said tubing supporting assembly having a base rotatably supported on said bearing ring;

A readily removable split ring attached to the bottom of said body and a mating groove in said tubing supporting assembly receiving said split ring whereby said tubing supporting assembly is releasably retained in said body;

A plurality of flappers on the top of said tubing supporting assembly base;

Means in connection with said flappers operable to position said flappers in concert to a horizontal or vertical attitude; and Means on said base operatively acting on one of said flappers whereby said flappers are retained in the selected attitude.

8. A convertible elevator for tubing comprising in combination:

An elevator body having a vertical opening therethrough;

A readily replaceable tubing supporting assembly in said vertical opening and having a vertical passage through said tubing supporting assembly, said assembly having tubing supporting means operable to hold and release tubing extending through said vertical passage;

Means releasably retaining said assembly in said elevator body vertical opening;

Said tubing supporting assembly being rotatable with respect to said elevator body;

Said elevator body being recessed radially outward on its inner circumference to form a bearing support and having a bearing race mounted in said recess;

A bearing ring seated on said bearing race with means retaining said bearing ring on said race;

Said tubing supporting assembly having a base rotatably supported on said bearing ring;

A readily removable split ring attached to the bottom of said body and a mating groove in said tubing supporting assembly receiving said split ring whereby said tubing supporting assembly is releasably retained in said body;

A plurality of flappers on the top of said tubing supporting assembly base, said flappers having integral depending means adapted to seat on the outer wall of said vetrical passage below top thereof;

Means in connection with said flappers operable to position said flappers in concert to a horizontal or vertical attitude; and Means on said base operatively acting on one of said flappers whereby said flappers are retained in the selected attitude.

9. A convertible elevator for tubing comprising in combination:

an elevator body having a vertical opening therethrough;

a readily replaceable tubing supporting assembly in said vertical opening and having a vertical passage through said tubing supporting assembly, said assembly having tubing supporting means operable to hold and release tubing extending through said vertical passage;

means releasably retaining said assembly in said elevator body vertical opening;

said tubing supporting assembly being rotatable with respect to said elevator body;

said elevator body being recessed radially outward on its inner circumference to form a bearing support, and having a bearing race mounted in said recess;

a bearing ring seated on said bearing race with means retaining said bearing ring on said race;

said tubing supporting assembly having a base rotatably supported on said bearing ring;

a wear ring removably attached to the bottom of said base and forming therewith a retainer groove;

means comprising a split ring removably attached to the bottom of said body and extending radially into said groove whereby said tubing supporting assembly is releasably retained in said body;

a plurality of slips removably positioned in said vertical passage;

arm means pivotally mounted on said base;

lever means attached to said slip and pivotally and slidably mounted on said arm means, said lever means being actuatable for moving said slips into and out of said vertical passage;

a plurality of stop means on said base and on said arm whereby the latter may be pivoted outwardly and downwardly a limited amount only with respect to said base and pivoted upwardly and inwardly to a substantially vertical position;

means operable to position said lever with respect to said arm whereby said lever means may be moved to a substantially vertical position; and means retaining said arm means and said lever means in the selected position.

10. An article of manufacture comprising a tubing supporting assembly for a convertible elevator and adapted to be readily inserted in and removed from a vertical opening in an elevator body, comprising in combination:

a base means adapted to rest on the top of such elevator body and extend into a vertical opening thereof, said base means having a vertical passage therethrough;

flapper tubing supporting means pivotally mounted on said base means;

means on said flapper supporting means operable to position said flapper means in a horizontal attitude and to change the attitude to a vertical attitude; and means on said base means resisting a change in attitude of said flapper means.

11. A tubing supporting assembly as claimed in claim 10, wherein said base means has a radially outwardly extending portion adapted to rest on and be supported by said elevator body, and wherein said vertical passage through said base means has its upper portion slanting inwardly from the top down in the form of an inverted truncated cone and its lower portion slanting inwardly from the bottom up in the form of a truncated cone.

12. A tubing supporting assembly as set forth in claim 11, wherein the flapper tubing supporting means comprises two flappers pivotally mounted at their outer ends operable to be pivoted from a horizontal attitude to a vertical attitude and from a vertical attitude to a horizontal attitude, said flappers each being recessed at its inner end whereby when in the horizontal position the flappers surround a tube extending through said vertical passage, said flappers also each having a depending skirt portion adapted to seat on the inclined surface of the upper inverted conical portion of said vertical passage.

13. A tubing supporting assembly as claimed in claim 10, wherein the means operable to move said flappers in claim 12 include eccentric means on each of said flappers and linkage extending therebetween whereby a change of attitude of one of said flappers results in a similar change of attitude in the other of said flappers.

14. A tubing supporting asembly as claimed in claim 13, wherein the means resisting a change in attitude of said flapper means comprises a detent on said base means pressing against and frictionally engaging one of said flappers thereby resisting a change in attitude of said flapper.

15. An article of manufacture comprising a tubing supporting assembly for a convertible elevator and adapted to be readily inserted in and removed from said elevator, comprising in combination:

a base means having a passage therethrough;

slip means movable into and out of said pasage, whereby tubing in said passage is supported when said slip means are in said passage and free of support when said slip means are clear of said passage;

means including a pivotal arm, and a lever attached to said slip means pivotally mounted on said arm and operable to position said slip means; and means operable to position said arm and lever means in a generally vertical position when not in use whereby they are vertically above said base means and substantially within the outer periphery of said base means and thus clear of any surrounding obstructions.

16. A tubing supporting assembly as set forth in claim 15, wherein said base means is adapted to rest on top of such elevator body and extend into a vertical opening thereof, said base means having a vertical passage therethrough which vertical passage has an inwardly slanting surface from the top forming a ramp means and a downwardly slanting surface portion below said ramp means in the form of an inverted truncated cone, and a removable wear ring extending into said vertical passage and attached to said base means, said removable wear ring comprising a readily exchangeable lower guide means for tubing in said passage.

17. A tubing supporting assembly as set forth in claim 15, wherein said slip means comprises a center slip attached to said lever, a plurality of side slips pivotally attached to said center slip and spring means urging said side slips to swing outwardly with respect to said center slip whereby movement of said slip means upwardly in said vertical passage spreads said side slips apart thus cleaning the vertical passage for the movement of tubing therethrough.

18. A tubing supporting assembly as set forth in claim 15, wherein said arm is pivotally mounted on said base means and has a longitudinally extending slot means therein, wrist pin means having said lever means mounted thereon and journaled in said slot means, latch means operable to retain selectively said wrist pin means in either end of said slot means, stop means limiting the pivotal movement of said arm means with respect to said base means and retaining said arm means in the selected position, and hook means on said base means engageable with hook means on said lever means to releasably retain said lever means in its slip disengaged position.

19. A tubing supporting assembly as set forth in claim 15, wherein there is provided a removable guide means having a central opening therein attached to said base means and positioned with said opening above the vertical passage through the base means whereby said guide serves to guide tubing extending through said vertical passage and to stabilize said tubing supporting assembly with respect to said tubing.

References Cited

UNITED STATES PATENTS

| | | | |
|---|---|---|---|
| 1,729,940 | 10/1929 | Hinderliter | 294—90 |
| 2,362,042 | 11/1944 | Abegg | 294—90 |
| 3,342,520 | 9/1967 | Haynes | 294—102 X |
| 3,351,372 | 11/1967 | Marks et al. | 294—90 |

ANDRES H. NIELSEN, *Primary Examiner.*